US012793081B2

(12) United States Patent
Gondra et al.

(10) Patent No.: US 12,793,081 B2
(45) Date of Patent: Nov. 10, 2026

(54) SYSTEMS AND METHODS FOR A METADATA DRIVEN MICROSERVICE FOR COMPLAINTS

(71) Applicant: WELLS FARGO BANK, N.A., San Francisco, CA (US)

(72) Inventors: Praveen Gondra, Fremont, CA (US); Lauren Quintanilla, Pleasant Hill, CA (US); Sebas Panikulam, Minneapolis, MN (US); Arif Rahman, Minneapolis, MN (US); Dave Herring, Chandler, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 214 days.

(21) Appl. No.: 18/463,665

(22) Filed: Sep. 8, 2023

(65) Prior Publication Data

US 2025/0086649 A1 Mar. 13, 2025

(51) Int. Cl.
*G06Q 30/016* (2023.01)
*G06Q 30/0282* (2023.01)

(52) U.S. Cl.
CPC ....... *G06Q 30/016* (2013.01); *G06Q 30/0282* (2013.01)

(58) Field of Classification Search
CPC .... G06Q 30/01; G06Q 30/015; G06Q 30/016; G06Q 30/0281; G06F 16/3329; G06F 16/90332; G06F 40/30; G06F 40/35; G06F 8/38; G06F 9/453; G06N 5/022; G06N 5/04; H04L 51/02
See application file for complete search history.

(56) References Cited

U.S. PATENT DOCUMENTS 11,151,283 B2 10/2021 Schwed et al.
11,163,586 B1 * 11/2021 Mathur ................. G06F 9/3836
11,349,947 B1 5/2022 Mungel et al.
(Continued)

FOREIGN PATENT DOCUMENTS

CN 114217796 A 3/2022

OTHER PUBLICATIONS

Mahajan et al., “Visual and textual consistency checking tools for graphical user interfaces,” IEEE Transactions on Software Engineering, vol. 23, No. 11, pp. 722-735, Nov. 1997, doi: 10.1109/32.637386. Attached. Retrieved from https://ieeexplore.ieee.org/abstract/document/637386 (Year: 1997).*

*Primary Examiner* — Bryan J Kirk
(74) *Attorney, Agent, or Firm* — Kilpatrick Townsend & Stockton LLP

(57) ABSTRACT

Systems and methods for a metadata driven microservice including: receiving data associated with a complaint; classifying the data based on a complaint type; retrieving, from a database of text elements, a set of text elements including metadata comprising display rules associated with a user interface, a set of text elements associated with the complaint type; providing a first user interface arranged based on the display rules comprising a first text element of the set of text elements and one or more input fields; receiving in the one or more input fields an input; and providing an updated user interface comprising a second text element of the set of text elements, the second text element arranged based on the display rules of the metadata.

17 Claims, 5 Drawing Sheets

300

(56) References Cited

U.S. PATENT DOCUMENTS

| | | | | |
|---|---|---|---|---|
| 2014/0143157 | A1* | 5/2014 | Jeffs | H04M 3/51 705/304 |
| 2019/0028588 | A1* | 1/2019 | Shinseki | H04M 3/5231 |
| 2019/0130414 | A1* | 5/2019 | Ellis | G06Q 30/016 |
| 2019/0278570 | A1 | 9/2019 | De Smet et al. | |
| 2023/0011254 | A1 | 1/2023 | Alaimo | |

* cited by examiner

SYSTEMS AND METHODS FOR A METADATA DRIVEN MICROSERVICE FOR COMPLAINTS

FIELD OF INVENTION

The present disclosure generally relates to user interface generation based on metadata of display elements, and more particularly to systems and methods for using microservices and metadata to generate a user interface.

BACKGROUND

While developers generally develop user interfaces to be as easy and simple to use as possible to cater the user experience to a broad range of users, the process of generating and updating user interfaces remains difficult. Developers determine locations and placements of elements of the user interface when initially designing the user interface, however changes to the placement of elements may require an update to an application providing the user interface or rewriting of the user interface's code. Current user interface generation methods are ill-equipped for adapting user interfaces based on the information and elements to be displayed. Current user interface generation methods do not use metadata of display elements or text elements to determine the user interface.

SUMMARY

According to certain embodiments, a method for a metadata driven microservice includes: receiving data associated with a complaint; classifying the data based on a complaint type; retrieving, from a database of text elements, a set of text elements associated with the complaint type wherein one or more text elements from the set of text elements includes metadata comprising display rules associated with a user interface; providing a first user interface arranged based on the display rules comprising a first text element of the set of text elements and one or more input fields; receiving in the one or more input fields an input; and providing an updated user interface comprising a second text element of the set of text elements, the second text element arranged based on the display rules of the metadata.

In a further embodiment, a method for a metadata driven microservice further includes: retrieving, from a database of enterprise rules, one or more enterprise rules associated with attributes of a complainant and the complaint type; and determining, based on the one or more enterprise rules, the complainant and the complaint type.

In a further embodiment, a method for a metadata driven microservice further includes: receiving an attachment associated with the complaint; and storing the attachment in an attachment database.

In a further embodiment, a method for a metadata driven microservice further includes: associating the input with the complaint; and storing the input and complaint in a complaint database.

The above methods can be implemented as computer-executable program instructions stored in a non-transitory, tangible computer-readable media and/or operating within a processor or other processing device and memory.

BRIEF DESCRIPTION

A full and enabling disclosure is set forth more particularly in the remainder of the specification. The specification makes reference to the following appended figures.

DETAILED DESCRIPTION

Figure 1:
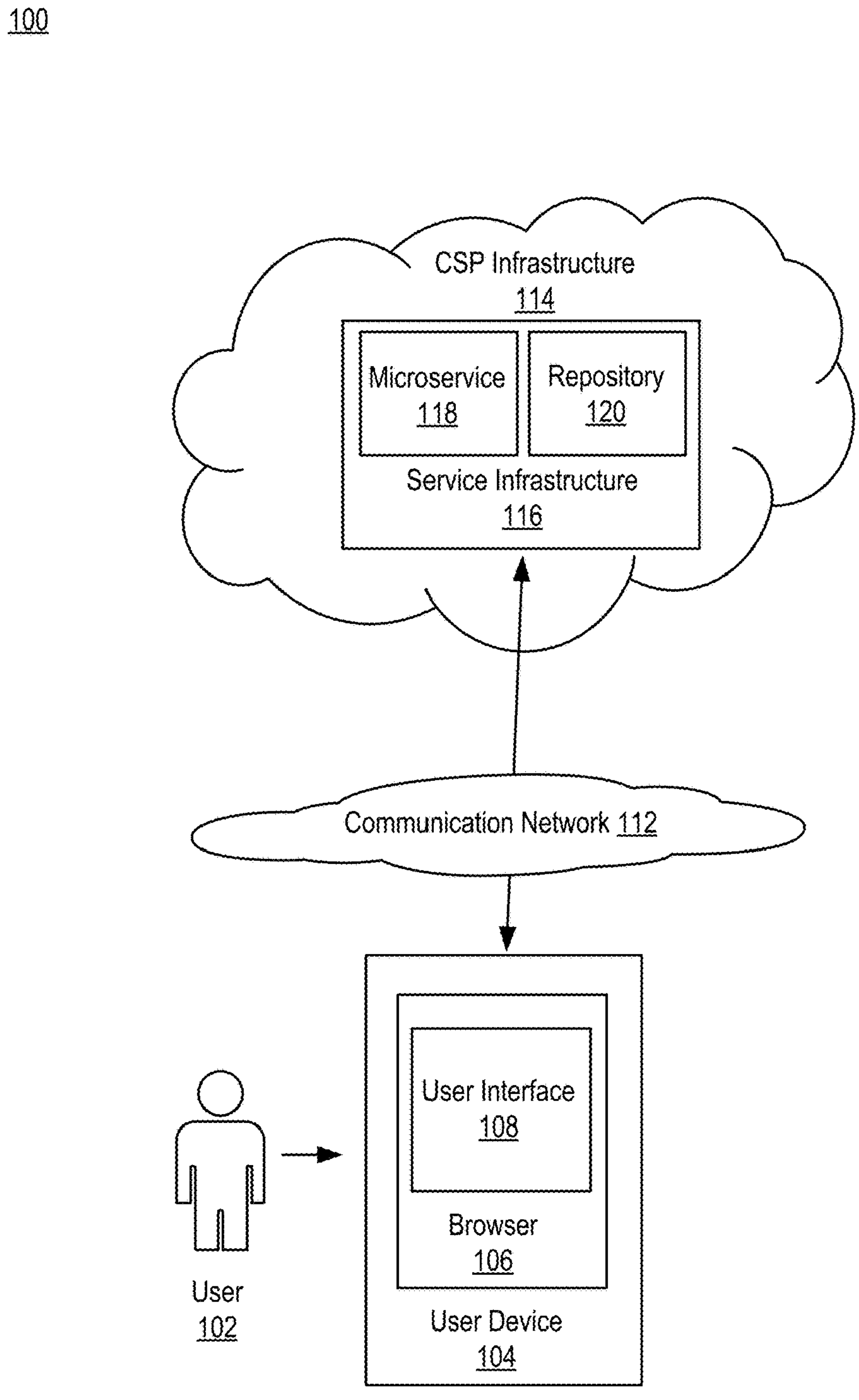
FIG. 1 illustrates an example system for a metadata driven microservice.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Examples of a Metadata Driven Microservice for Complaints

In one illustrative example, a system for a metadata driven microservice includes a microservice for generating user interfaces based on metadata. The microservice may be an application structured as a collection of individual services arranged to generate user interfaces based on metadata of one or more of input data, data elements, and text elements. The services are software that perform an individual task or collection of tasks, which may be reusable by or integrated into other software applications. These services may be executed remotely via a cloud services provider or locally on a user computing device.

In one example, the application may include a questionnaire microservice to capture and display user complaints. The application receives an input through a user interface on a web browser executed on a user computing device. The input may be associated with a user complaint, such as the user being upset with a product provided by an enterprise. The application receives the input and provides a series of prompts to organize the user's complaint. In some examples, the series of prompts includes one or more questionnaires. The microservice may provide questionnaires to the user using multiple services, described in further detail in the description of FIG. 2, and multiple databases such as a questionnaire database and instructions database.

The questionnaire database may include text elements associated with individual questions, or multiple questions including metadata associated with the order and conditions under which the questions are to be presented on a user interface. Individual questions of the questionnaire database may include text elements, such as a string of a question. Metadata of the text element may include traits defining a user interface, such as traits indicating placement, sizes, order, layer, and edits to objects of the user interface such as data elements, input fields, radio buttons, boxes, windows, and various icons and graphics. For example, the metadata may include information associated with layering objects, or hiding objects from the user interface. The metadata may further include information associated with edits to parts of a user interface. For example, a previous question may include metadata associated with providing a radio button to a user interface, and a subsequent question may include metadata associated with providing an edit to the radio button, such as highlighting the button when a user selects the button.

The instructions database may store rules and instructions for classifying complaints based on a complaint type, which may cause a different questionnaire to be retrieved by a user device from the questionnaire database, or which may adjust the order of questions in a retrieved questionnaire. For example, an instructions service and instructions database may use internal logic such as conditional statements to determine how to classify a complaint as a complaint type, or to determine an order of questions from a questionnaire to present to the user. In one example, the conditional statements may be satisfied by user inputs, such as by the user responses to questions. For example, a questionnaire may request information about the user, such as whether the user is an employee of the enterprise. The user may respond to the question by clicking a radio button indicating he or she is an employee, and a conditional statement may cause a request for the employee's employment number to be made visible to the user.

The browser or application constructs the user interface using the metadata of text elements or other data elements from the questionnaire database, such as by arranging data elements according to traits of the metadata. For example, the metadata may include information associated with the placement, size, color, font, resolution, layer, and orientation of various data elements, such as text or the placement of input fields.

Example Meta Data Driven Microservice System

FIG. 1 illustrates a metadata driven microservice system 100. The metadata driven microservice system 100 includes a user interface 108 able to receive input from a user 102. The web browser 106 may be executed on a user device 104 and provide the user interface 108 to be displayed by a display of the user device 104. The web browser 106 may communicate through communication network 112 with cloud service provider infrastructure 114 providing service infrastructure 116 of a microservice. Service infrastructure 116 may include and/or execute one or more microservices 118 and repositories 120.

As shown in FIG. 1, the user interface 108 displayed in a web browser 106. In some embodiments, the web browser 106 is alternatively an application executed locally on the user device 104. The user 102 may interact with the web browser 106 through the user interface 108 such as a by interacting with a guided user interface (GUI) on a web browser 106 or application running locally on the user device 104.

User 102 inputs information to the user interface 108 into various input fields and radio buttons of the user interface 108. In some examples, the user 102 may input information associated with a complaint. The user interface 108 further provides for display, on a display of the user device, information associated with the complaint including the complaint type and complainant.

In some examples, the user interface 108 includes a questionnaire of various predetermined questions associated with a complaint type or the complainant. The complaint type may be based on an issue addressed by the complaint or information associated with the user 102 filing the complaint (e.g., the complainant's title, whether the complainant is an employee or executive of the enterprise, or a customer). For example, when the complaint type is a service complaint such as a complaint about a particular service provided by an enterprise, the microservice 118 may provide a questionnaire with questions specific to the service. In further examples, the microservice 118 may provide a questionnaire specific to the complainant. For example, the microservice may use information associated with a user, such as a customer, filing a complaint to determine a questionnaire or individual questions associated with the user.

The complaint type may be based in part on the user 102 sending the complaint, such as when the complaint is from an employee or an executive of the enterprise (e.g., an executive office complaint). In further examples, the complaint type may include the are directed to a particular line of business or division of the enterprise (e.g., line of business complaint). In other examples, the complaint type may be determined from the office or organization to which the complaint should be escalated or transferred, which may be based on internal business rules or regulations. For example, business rules may indicate that line of business complaints should be escalated to a particular line of business.

The user 102 provides input to the user device 104 which is transmitted through a communication network 112 to service infrastructure 116 executed on cloud service provider infrastructure 114. In some examples, the service infrastructure may be executed locally on the user device 104 such as in an application of the user device 104.

The service infrastructure 116 may include one or more microservices 118 and repositories 120. The microservices 118 and repositories 120 are further described in the description of FIG. 2.

Microservice Architecture of a Metadata Driven Microservice for Complaints

Figure 2:
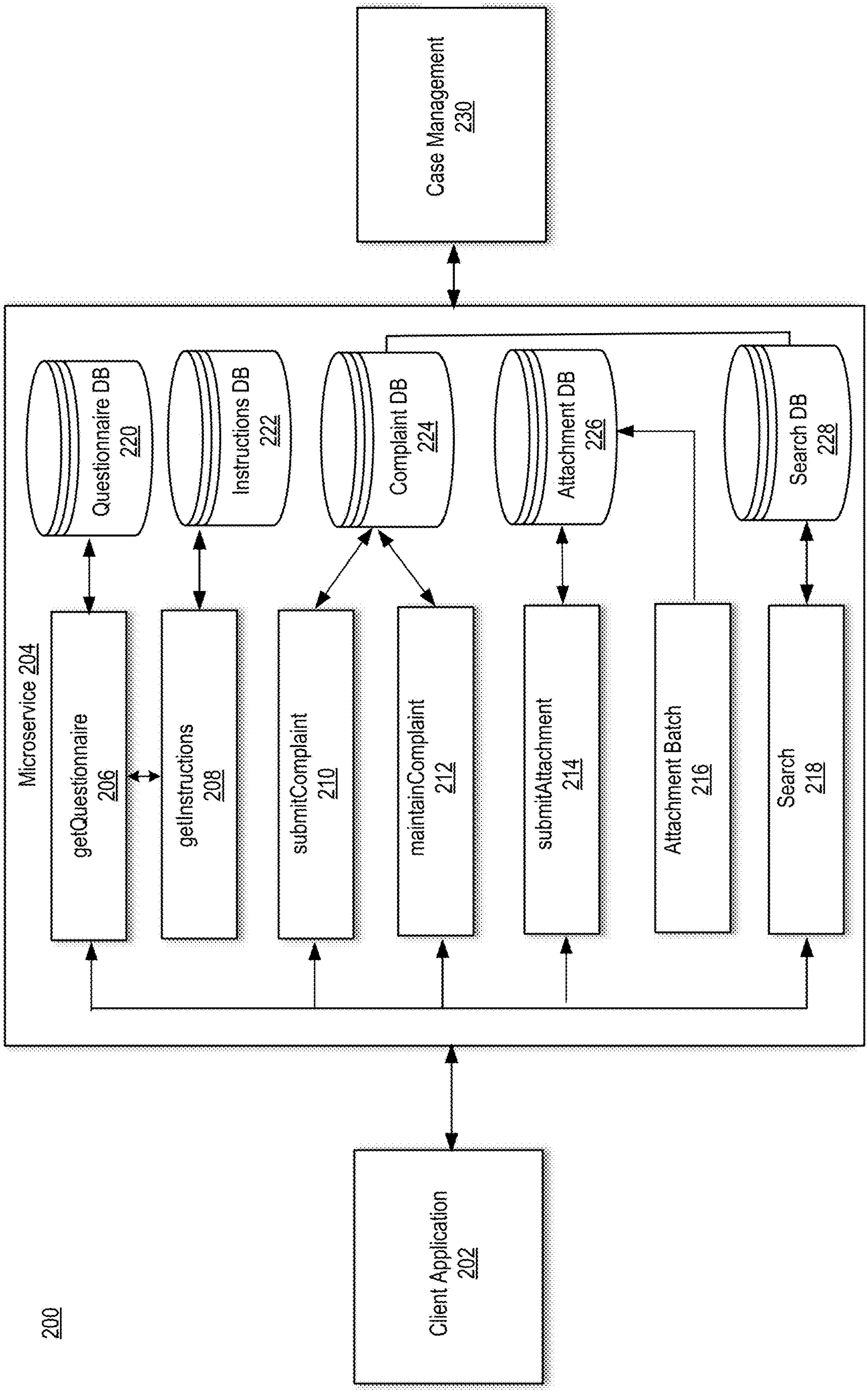
FIG. 2 illustrates an example microservice architecture of a metadata driven microservice for complaints.

FIG. 2 illustrates microservice architecture 200 of a metadata driven microservice for complaints. The microservice architecture 200 includes various individual software components communicating with various databases. For example, the microservice architecture 200 includes getQuestionnaire 206, getInstructions 208, submitComplaint 210, maintainComplaint 212, submitAttachment 214, AttachmentBatch 216, and Search 218 software components. The databases include a questionnaire database 220, instructions database 222, complaint database 224, attachment database 226, and a search database 228. The microservice 204 may receive from a client application 202, inputs such as information to file a complaint. The microservice 204 transmits results to another application such as case management 230. The client application 202 may include an application or web browser executed on a user device, such as the user device from FIG. 1. In some examples of the microservice architecture, the various individual elements or features of these software components and databases may be combined with other software components or databases.

The getQuestionnaire 206 component may collect data to resolve or escalate a complaint received from the client application 202. The getQuestionnaire 206 component returns the complaint questions from the questionnaire database 220 to a requesting channel. There may be multiple question sets that are returned by getQuestionnaire 206. The multiple question sets of getQuestionnaire 206 may be returned based on the complaint type and information associated with the complainant received from the client application 202.

The question sets returned from getQuestionnaire 206 may include text elements and other data elements such as graphics and input fields arranged based on metadata of the elements. For example, a question set may include a prompt such as "Is this complaint directed to performance issues with a product or service?" with a radio button for responding to the prompt. The question set includes metadata associated with the arrangement of the elements to generate or edit the user interface of the client application 202. For example, the question sets may include metadata with traits indicating the positioning of the text prompt and radio buttons, the font of the prompt, and the placement and layer of graphics such as placing an enterprise logo in the background of a user interface or adjusting the visibility of individual questions.

The getInstructions 208 component may collect instructions from an instructions database 222 to classify the complaint into different complaint types. For example, the getInstructions 208 component may classify a complaint into one or more of a service complaint, a line of business complaint, and an executive office complaint based on attributes of the complaint such as issues raised in the complaint. In some examples, the complaint type is based on whether the complaint should be routed or escalated to a particular part of the business based on severity of the complaint, parties involved in the complaint, or in compliance with business rules or regulations. For example, a complaint directed to a data breach may be escalated from a service complaint to a line of business complaint to prioritize the complaint and prevent further breaches. In other examples, the complaint types are based on information associated with the user filing a complaint. For example, the getInstructions component may classify complaints filed by preferred customers, vendors, or employees as higher priority over complaints from other individuals. The getInstructions 208 component may receive information associated with the complaint from the getQuestionnaire 206 component as users provide inputs for the question sets of the getQuestionnaire 206.

An enterprise may store business rules associated with how to identify complaints to escalate and classify in the instructions database 222. For example, an enterprise may determine that all complaints which may introduce liability to the company, such as injuries to customers occurring on enterprise property, are escalated to a line of business. Other business rules may include escalating and classifying complaints based on an estimated cost to remedy a complaint. For example, a business rule may include escalating complaints that would cost the enterprise over a certain threshold to remedy (e.g., over a thousand dollars) to an executive office prior to taking action.

The submitComplaint 210 component registers a complaint with a complaint identifier such as an ID number. The submitComplaint 210 component stores the complaint and complaint identifier in a complaint database 223. The submitComplaint 210 component further transmits the complaint to further microservices or applications such as case management 230 based on the complaint type or complainant. In some examples, the submitComplaint may add labels to the complaint such as identification number, date of the complaint, status of the complaint, and a software application and hardware associated with the complaint.

The maintainComplaint 212 component provides updates to complaints submitted by submitComplaint 210 and complaints stored in the complaint database 224. In some examples, users may provide additional information from client application 202 to update a complaint. In other examples, an enterprise employee managing the complaint may provide notes to the complaint or manually escalate the complaint to a different complaint type.

The submitAttachment 214 component provides users and enterprise employees the ability to tag artifacts, such as photographic and video evidence, associated with a complaint, and store the attachment in the attachment database 226. The attachmentBatch 216 component may provide batch processing tasks for the attachment database 226, such as making backups of attachments and compiling attachments to transmit to the case management 230.

The Search 218 component provides enterprise employees or other individuals the ability to search and filter complaints. The Search database 228 may communicate with the Complaint database 224 to retrieve and transmit complaints to enterprise employees. For example, enterprise employees may filter the complaints based on complaint type, complainant, individual responses from the question sets of getQuestionnaire 206, and attachments from submitAttachment 214.

Case management 230 may be an application or systems downstream from the microservice 204. Case Management may include systems for allowing enterprise employees to fetch and edit complaints. Case Management 230 may route complaints to particular individuals or teams based on the complaint type.

Illustrative Method of Operating a Metadata Driven Microservice for Complaints

Figure 3:
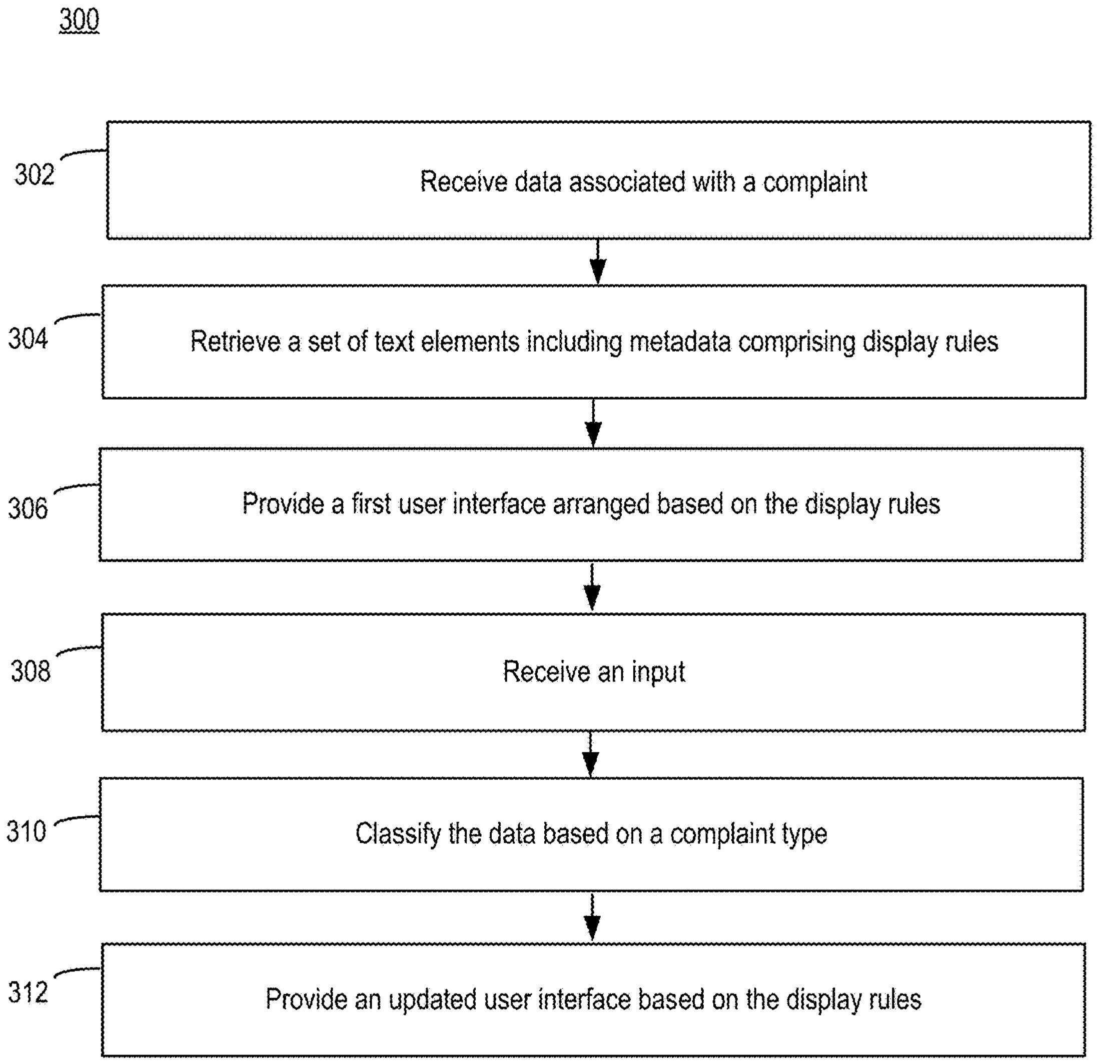
FIG. 3 illustrates a flow chart for a method of operating a metadata driven microservice.

FIG. 3 is a flowchart showing an illustrative method 300 of operating a metadata driven microservice for filing complaints. In some examples, some of the steps in the flow chart of FIG. 3 are implemented in program code executed by a processor, for example, the processor in a general-purpose computer, mobile device, or server. In some examples, these steps are implemented by a group of processors. In some examples the steps shown in FIG. 3 are performed in a different order or one or more steps may be skipped. Alternatively, in some examples, additional steps not shown in FIG. 3 may be performed.

At block 302, the method 300 receives data associated with a complaint. The data may include information associated with the complaint such as a description of the issue. For example, the user may provide an input to a user device, as described further in FIG. 1 and FIG. 2. The user inputs information such as a description of the issue, or a selection of an issue from a list of issues. For example, a user may file a complaint regarding an automatic teller machine (ATM) not releasing his or her card. The user may select a general complaint form from a banking application associated with his or her card. The user may further indicate additional details regarding products or services at issue in the complaint.

In some examples, the method may further include determining whether the received data is associated with a complaint. For example, an enterprise may have a general correspondence form from which the metadata driven microservice may determine whether user input to the general correspondence form is associated with a complaint. In one such example, the microservice may include a software component configured to use Natural Language Processing (NLP) to determine whether a general correspondence form is a complaint.

At block 304, the method 300 retrieves a set of text elements including metadata comprising display rules. The metadata may include traits or labels that indicate how a browser, application, or user device should render text elements and other data elements on a user interface. For example, the metadata may include traits such as positioning of elements, visibility of elements, and inclusion of data elements such as input fields, radio buttons, and graphics in the user interface. For example, the text elements may include a questionnaire with question branches based on user responses to questions. The metadata associated with text elements may further include whether the text element is visible or the conditions under which the data element is visible on the user interface. As user inputs fulfill the conditions (e.g., conditional statements indicating which questions are visible), the microservice may cause the user interface to display text elements associated with the fulfilled conditions.

At block 306, the method 300 provides a first user interface arranged based on the display rules. A browser or application executed on the user device, as further shown in FIG. 1, generates a user interface according to the metadata of the retrieved set of text elements. The browser or application may arrange the text elements based on traits of the metadata, which may include the position of elements within the user interface. The browser or application may further identify the various traits of the metadata and execute instructions for generating the user interface based on these traits. For example, a metadata trait of a text element may include an associated font and size. The browser or application may identify the metadata trait and generate the text element in the associated font and size. In some examples, the metadata driven microservice generates the user interfaces and provides the user interface to a user device.

At block 308, the method 300 receives an input. For example, the user may provide an input to the user interface generated at block 308, such as by inputting a string input into an input field or selecting a radio button.

At block 310, the method 300 classifies the data based on a complaint type. In some examples, the method 300 determines the complaint type from the user input at block 308. For example, the user input may be associated with a selection of a complaint type, such as indicating that the complaint is associated with a good or service. In other examples, the method 300 classifies the data based on received data associated with the complaint from block 302. For example, a user may input data indicating that the complaint is associated with a particular line of business or involves an issue over a preset dollar amount. In further examples, complaint types are associated with a location to which the complaint should be escalated, for example to a line of business, executive office, or a product and services team. A software component, such as the getInstructions component further described in the description of FIG. 2, may classify the complaint according to business and enterprise rules. Business and enterprise rules may include various procedures and regulations defining how the enterprise sorts and prioritizes complaints, such as whether the enterprise prioritizes resolving complaints against more popular products over other complaints. In some examples, the method 300 may use natural language processing (NLP) to analyze user input or the data associated with the complaint to classify the data based on a complaint type.

At block 312, the method 300 provides an updated user interface based on the display rules. For example, the metadata associated with the display rules may include traits associated with conditions in which the user interface includes particular data elements, such as when a user selects a particular product as a source of the complaint, the browser, application, or microservice may generate an updated user interface with text elements associated with the product made visible, and text elements associated with a different product removed from view.

Example User Interfaces and Example Code

Figure 4A:
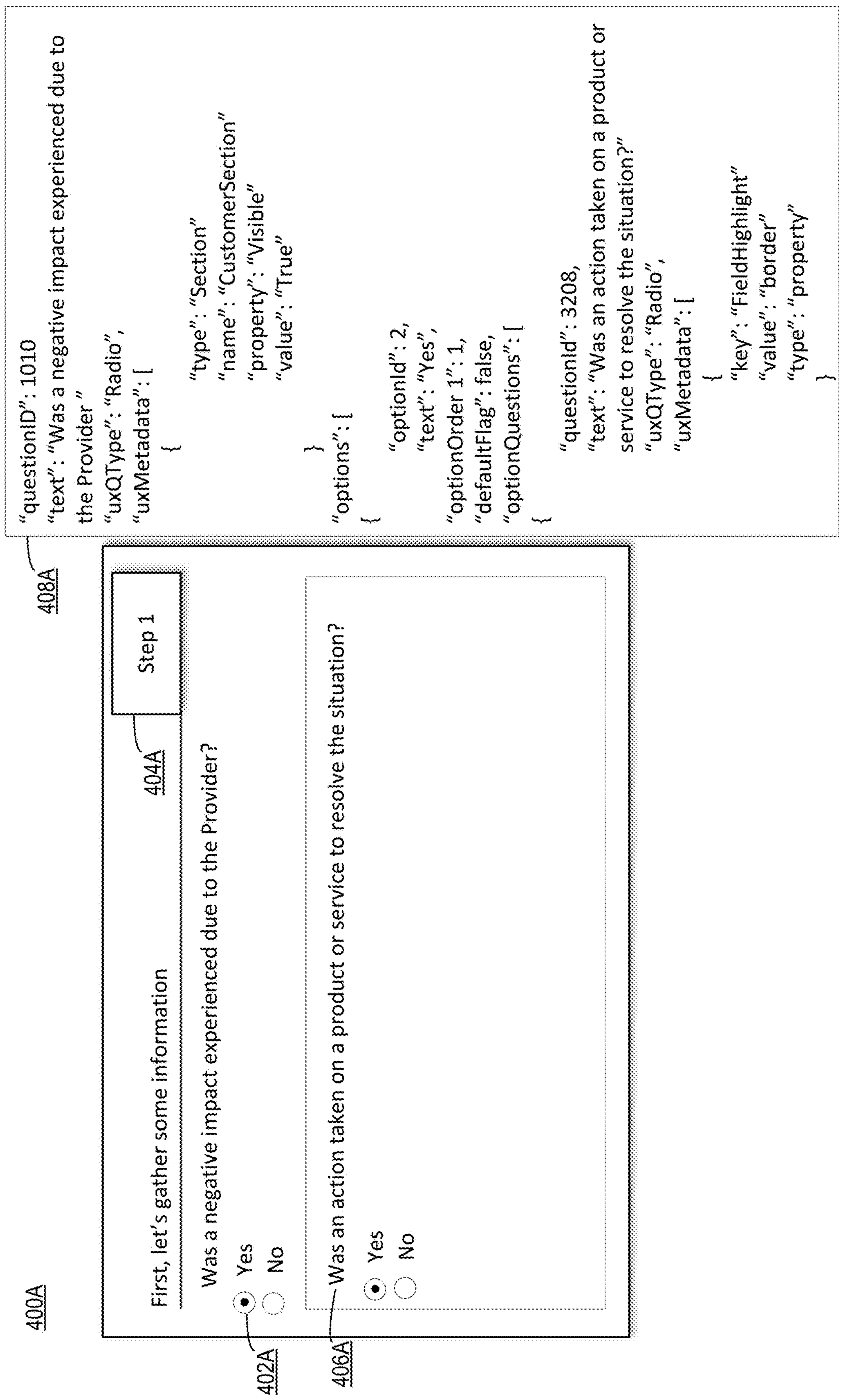
FIG. 4A and FIG. 4B illustrate example user interfaces generated by the microservice and example code associated with the user interface.
Figure 4B:
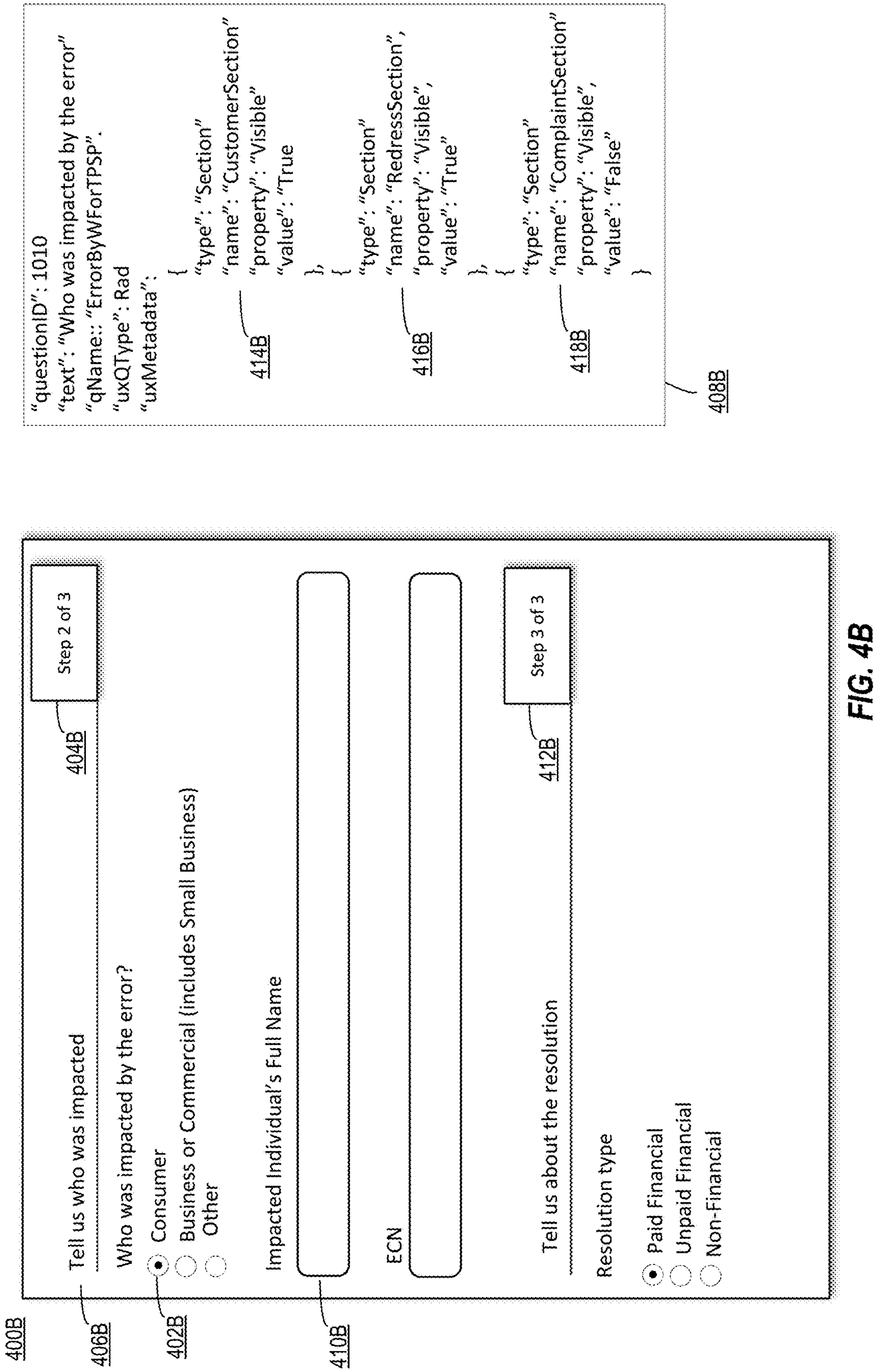

FIG. 4A and FIG. 4B illustrate example user interfaces generated from metadata and example code associated with the generated user interfaces.

FIG. 4A illustrates an example user interface 400A including an initial request for information about a user complaint. The user interface includes radio buttons 402A, a graphic 404A, and text element 406A. FIG. 4A further includes code 408A associated with the generation of user interface 400A.

An example snippet of code indicating metadata traits associated with the construction of the user interface in FIG. 4A includes:

```
"questionID": 1010
"text": "Was a negative impact experienced due to the Provider "
"uxQType": "Radio",
"uxMetadata": [
   {
     "type": "Section"
     "name": "CustomerSection"
     "property": "Visible"
     "value": "True"
   }
"options": [
{
   "optionId": 2,
   "text": "Yes",
"optionOrder 1": 1,
"defaultFlag": false,
"optionQuestions": [
{
   "questionId": 3208,
   "text": "Was an action taken on a product or       service
to resolve the situation?"
   "uxQType": "Radio",
   "uxMetadata": [
      {
      "key": "FieldHighlight"
      "value": "border"
      "type": "property"
      }
```

Users may provide input to the radio buttons 402A to cause changes to the user interface 400A. For example, the metadata associated with the generation of user interface 400A may include conditional statements indicating that when the radio buttons 402A are selected by a user, the user interface 400A transitions to the user interface 400B of FIG. 4B.

FIG. 4B illustrates an example user interface 400B generated from metadata in response to the inputs provided in FIG. 4A. For example, the user interface 400B includes radio buttons 402B, graphics 404B and 412B representing sections of the user interface 400B, a text element 406B, and an input field 410B. FIG. 4B further includes a snippet of code 408B associated with the generation of user interface 400B from metadata of text element 406B. The snippet of code 408B includes three examples of using metadata to adapt the user interface, including code associated with a Customer Section 414B, Redress Section 416B, and Complaint Section 418B, which may include metadata associated with the location and visibility of graphics 404B 412B.

An example snippet of code indicating metadata traits associated with the construction of the user interface in FIG. 4B includes:

```
"questionID": 1010
"text": "Who was impacted by the error"
"qName:: "ErrorByWForTPSP".
"uxQType": Rad
"uxMetadata":
   {
     "type": "Section"
     "name": "CustomerSection"
     "property": "Visible"
     "value": "True
   },
```

-continued

```
{
  "type": "Section"
  "name": "RedressSection",
  "property": "Visible",
  "value": "True"
},
{
  "type": "Section"
  "name": "ComplaintSection"
  "property": "Visible",
  "value": "False"
}
```

By way of example, the snippet of code indicates when various data elements of the user interface are visible, such as when a user selects particular radio buttons 402B.

Example Advantages of a Metadata Driven Microservice

Enterprises may have various mobile applications for the different products and services the enterprise provides. By including metadata with instructions indicating how to display elements on a user interface, the enterprise may more easily edit and standardize user interfaces across the various mobile applications. Further, by using metadata of text elements and other data elements to generate user interfaces, errors in user interfaces are more easily fixed across multiple applications because changes to the interface may be made at an initial source, such as the questionnaire database 220 of FIG. 2, and executed across multiple client applications using the microservice. The metadata driven microservice is further able to sort, direct, and maintain complaints for an enterprise, across multiple mobile applications.

General Considerations

Although the subject matter has been described in language specific to structural features or methodological acts, it is to be understood that the subject matter of the appended claims is not necessarily limited to the specific features or acts described above. Rather, the specific features and acts described above are disclosed as examples.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

Although the disclosure has been shown and described with respect to one or more implementations, equivalent alterations and modifications will occur based on a reading and understanding of this specification and the drawings. The disclosure includes all such modifications and alterations and is limited only by the scope of the following claims.

What is claimed is:

1. A method comprising:

receiving, from a user device via a network, data associated with a complaint;

retrieving, by a first microservice, one or more rule sets stored in an instructions database;

executing computer logic to classify the data, wherein the computer logic is configured to classify the data using the one or more rule sets stored in the instructions database, wherein the one or more rule sets are a) based at least on one or more enterprise rules associated with attributes of a complainant, a complaint type, or the complaint and b) comprise conditional statements that analyze the attributes of the complaint to determine the complaint type;

retrieving, by a second microservice and from a database of text elements, a set of text elements associated with the complaint type determined via the executed computer logic, wherein one or more of the text elements includes metadata comprising display rules associated with a user interface;

controlling generation and arrangement of a first user interface based on the display rules from the metadata to configure a first text element of the set of text elements and one or more input fields, wherein controlling comprises executing instructions that specify at least spatial placement, visibility, and interactive behavior of said first text element and input fields within the first user interface;

providing the first user interface to the user device;

receiving in the one or more input fields an input;

determining, by the second microservice, that the input satisfies one or more conditions included in at least one of the conditional statements that analyze the attributes, wherein the one or more conditions is associated with the set of text elements and wherein the satisfied condition modifies at least one of the display rules of the metadata; and automatically providing, to the user device and responsive to the input satisfying one or more conditions associated with the set of text elements, an updated user interface comprising a second text element of the set of text elements, the second text element arranged based on the at least one modified display rule of the metadata.

2. The method of claim 1, wherein the attributes of the complaint include one or more of: an identification number, a date of the complaint, a status of the complaint, a software application, or a hardware associated with the complaint.

3. The method of claim 1, wherein the set of text elements is a questionnaire associated with the complaint type.

4. The method of claim 1, wherein the complaint type is one of a line of business complaint, a service complaint, and an executive office complaint.

5. The method of claim 1, further comprising:

receiving an attachment associated with the complaint; and storing the attachment in an attachment database.

6. The method of claim 1, further comprising:
associating the input with the complaint; and
storing the input and the complaint in a complaint database.

7. The method of claim 1, wherein the display rules are for one or more of: arranging font, color, size, or resolution of one or more text elements, input fields, or graphics.

8. A non-transitory computer readable medium comprising instructions that when executed by one or more processors cause the one or more processors to:
receive data associated with a complaint;
retrieve, by a first microservice, one or more rule sets stored in an instructions database;
execute computer logic to classify the data, wherein the computer logic is configured to classify the data using the one or more rule sets stored in the instructions database, wherein the one or more rule sets are a) based at least on one or more enterprise rules associated with attributes of a complainant, a complaint type, or the complaint and b) comprise conditional statements that analyze the attributes of the complaint to determine the complaint type;
retrieve, by a second microservice and from a database of text elements, a set of text elements associated with the complaint type determined via the executed computer logic, wherein one or more of the text elements includes metadata comprising display rules associated with a user interface;
control generation and arrangement of a first user interface based on the display rules from the metadata to configure a first text element of the set of text elements and one or more input fields, wherein controlling comprises executing instructions that specify at least spatial placement, visibility, and interactive behavior of said first text element and input fields within the first user interface;
provide the first user interface to a user device;
receive in the one or more input fields an input;
determine, by the second microservice, that the input satisfies one or more conditions included in at least one of the conditional statements that analyze the attributes, wherein the one or more conditions is associated with the set of text elements and wherein the satisfied condition modifies at least one of the display rules of the metadata; and
automatically provide, to the user device and responsive to the input satisfying one or more conditions associated with the set of text elements, an updated user interface comprising a second text element of the set of text elements, the second text element arranged based on the at least one modified display rule of the metadata.

9. The non-transitory computer readable medium of claim 8, wherein the attributes of the complaint include one or more of: an identification number, a date of the complaint, a status of the complaint, a software application, or a hardware associated with the complaint.

10. The non-transitory computer readable medium of claim 8, wherein the set of text elements is a questionnaire associated with the complaint type.

11. The non-transitory computer readable medium of claim 8, wherein the complaint type is one of a line of business complaint, a service complaint, and an executive office complaint.

12. The non-transitory computer readable medium of claim 8, wherein the instructions cause the one or more processors to:
receive an attachment associated with the complaint; and
store the attachment in an attachment database.

13. The non-transitory computer readable medium of claim 8, wherein the instructions cause the one or more processors to:
associate the input with the complaint; and
store the input and the complaint in a complaint database.

14. The non-transitory computer readable medium of claim 8, wherein the display rules are for one or more of: arranging font, color, size, or resolution of one or more text elements, input fields, or graphics.

15. A system comprising:
one or more processors configured to:
receive data associated with a complaint;
retrieve, by a first microservice, one or more rule sets stored in an instructions database;
execute computer logic to classify the data, wherein the computer logic is configured to classify the data using the one or more rule sets stored in the instructions database, wherein the one or more rule sets are a) based at least on one or more enterprise rules associated with attributes of a complainant, a complaint type, or the complaint and b) comprise conditional statements that analyze the attributes of the complaint to determine the complaint type;
retrieve, by a second microservice and from a database of text elements, a set of text elements associated with the complaint type determined via the executed computer logic, wherein one or more of the text elements includes metadata comprising display rules associated with a user interface;
control generation and arrangement of a first user interface based on the display rules from the metadata to configure a first text element of the set of text elements and one or more input fields, wherein controlling comprises executing instructions that specify at least spatial placement, visibility, and interactive behavior of said first text element and input fields within the first user interface;
provide the first user interface to a user device;
receive in the one or more input fields an input;
determine, by the second microservice, that the input satisfies one or more conditions included in at least one of the conditional statements that analyze the attributes, wherein the one or more conditions is associated with the set of text elements and wherein the satisfied condition modifies at least one of the display rules of the metadata; and
automatically provide, to the user device and responsive to the input satisfying one or more conditions associated with the set of text elements, an updated user interface comprising a second text element of the set of text elements, the second text element arranged based on the at least one modified display rule of the metadata.

16. The system of claim 15, wherein the attributes of the complaint include one or more of: an identification number, a date of the complaint, a status of the complaint, a software application, or a hardware associated with the complaint.

17. The system of claim 15, wherein the set of text elements is a questionnaire associated with the complaint type.

* * * * *